Dec. 22, 1953   G. W. HOWARD   2,663,238
AGRICULTURAL APPARATUS FOR BLOCKING ROW CROPS AND THE LIKE
Filed Oct. 8, 1947   7 Sheets-Sheet 4

INVENTOR.
Graham W. Howard
BY
ATTORNEY

Dec. 22, 1953  G. W. HOWARD  2,663,238
AGRICULTURAL APPARATUS FOR BLOCKING ROW CROPS AND THE LIKE
Filed Oct. 8, 1947  7 Sheets-Sheet 6

INVENTOR.
Graham W. Howard
BY
ATTORNEY

Patented Dec. 22, 1953

2,663,238

UNITED STATES PATENT OFFICE 2,663,238

AGRICULTURAL APPARATUS FOR BLOCKING ROW CROPS AND THE LIKE

Graham W. Howard, Fort Collins, Colo.

Application October 8, 1947, Serial No. 778,610

20 Claims. (Cl. 97—23)

This invention relates to agricultural apparatus, and more particularly to an apparatus for blocking or thinning row crops, such as sugar beets and the like. This invention is related to the subject matter of my copending application Serial No. 728,918, filed February 15, 1947, now Patent No. 2,627,216.

Normally, a considerably greater number of seeds are placed in the ground, during the planting of sugar beets and the like, than would be necessary to produce the number of plants which the field can accommodate when the plants are fully grown, if full germination took place. This excess number of seeds insures adequate germination, since a percentage of the seeds normally do not produce plants, but usually germination in varying degrees of excess takes place in most rows or portions of a row. It is therefore customary, when the plants reach a predetermined height, such as up to six inches, for example, to block or thin out the beets, in which operation all of the plants are removed from spaced portions of the row, leaving "block." Of course, after the first blocking, the blocks may be again thinned out, so as to leave only the desired number of plants, to provide sufficient ground space for each plant remaining to develop as fully as possible. Previous to the invention of my application Serial No. 728,918, now Patent No. 2,627,216, the blocking operations (particularly in the case of sugar beets) were carried out by hand—time consuming and backbreaking work. Such work has been performed by a very low class of unskilled labor, and therefore obtainable at a relatively low wage. The capacity of one worker to block or thin a predetermined portion of a row is quite limited, and such hand operations are therefore economically feasible only as long as the wage paid is low in proportion to the return to the grower. Thus, any considerable increase in the cost of labor for blocking and thinning reduces considerably the margin of profit for the grower. Furthermore, as precision distributed planting is approached and seed emergence is improved, the blocking of the planted crop can become a means of leaving the desired final stand, thus eliminating a maximum amount of hand labor and also materially assisting in weed control and soil mulch conditions.

In accordance with the method of the invention of my application Serial No. 728,918, now Patent No. 2,627,216, beets or other row crops are blocked by moving a plurality of spaced cutting blades simultaneously across the plant rows. The direction of movement is preferably perpendicular to the plant rows, so that the same spacing will occur in each row. The blades may be disposed in two sets—a front set and a back set—and variations in the width of the spaced sections may be obtained by changing the position of the front set of blades laterally with respect to the rear set of blades, or vice versa, or moving the blades pivotally for adjustment.

The apparatus of my application, Serial No. 728,918, now Patent No. 2,627,216, may take several forms, in each of which the blades are mounted on front and rear supporting members. In one form, the supporting members are maintained rigid relative to each other, and the blades are pivotally mounted thereon and pivoted by a central screw or the like, connected to each of the blades by an arm or link. In another form, the front and rear supports are pivotally mounted on a central supporting member, and the blades mounted in fixed position thereon so that the front and rear sets of blades may be moved as units. In both forms, the movement of the blades increases or decreases the width of the spaces over which the plants are removed, thus decreasing or increasing the width of the blocks. Such apparatus is adapted to be mounted at the rear of a tractor, for instance, and a screw adjustment provided which can be reached by the operator from the seat of the tractor, either to cause all the blades to pivot together, or to cause the front and rear supporting members to move laterally in opposite directions. The present invention is an improvement upon such apparatus.

Among the objects of this invention are to provide novel agricultural apparatus for blocking operations and the like, as on sugar beets and similar plants; to provide such apparatus which is especially effective in operation, particularly in carrying out the method of my application, Serial No. 728,918, now Patent No. 2,627,216; to provide such apparatus which is capable of adjustment to accommodate differences in the heaviness of the plant growth, i. e., to change the width of the block, and also to change the width of block over different portions of the area covered by the apparatus; to provide such apparatus by which side draft may be eliminated; to provide such an apparatus which may be mounted upon a tractor or the like, to insure maximum productivity; to provide such apparatus in which the adjustment of the block widths may be made during operation; to provide such apparatus which may take one of several forms, with variations in the more detailed elements of each; to provide such apparatus which is sufficiently simple for easy operation yet sturdy in construction and therefore able to withstand the rigors of hard abuse and continued operation; and to provide various forms of the apparatus by which numerous other adjustments may be made. Other objects and the novel features of this invention will become apparent from the description which follows.

Two embodiments of agricultural apparatus, constructed in accordance with this invention, are illustrated in the accompanying drawings, in which:

Fig. 8 is a top plan view of apparatus forming a second embodiment of this invention, and mounted on the rear of a still different make of tractor;

Fig. 9 is a rear elevation of the central portion of the apparatus of Fig. 8;

Figure 1:
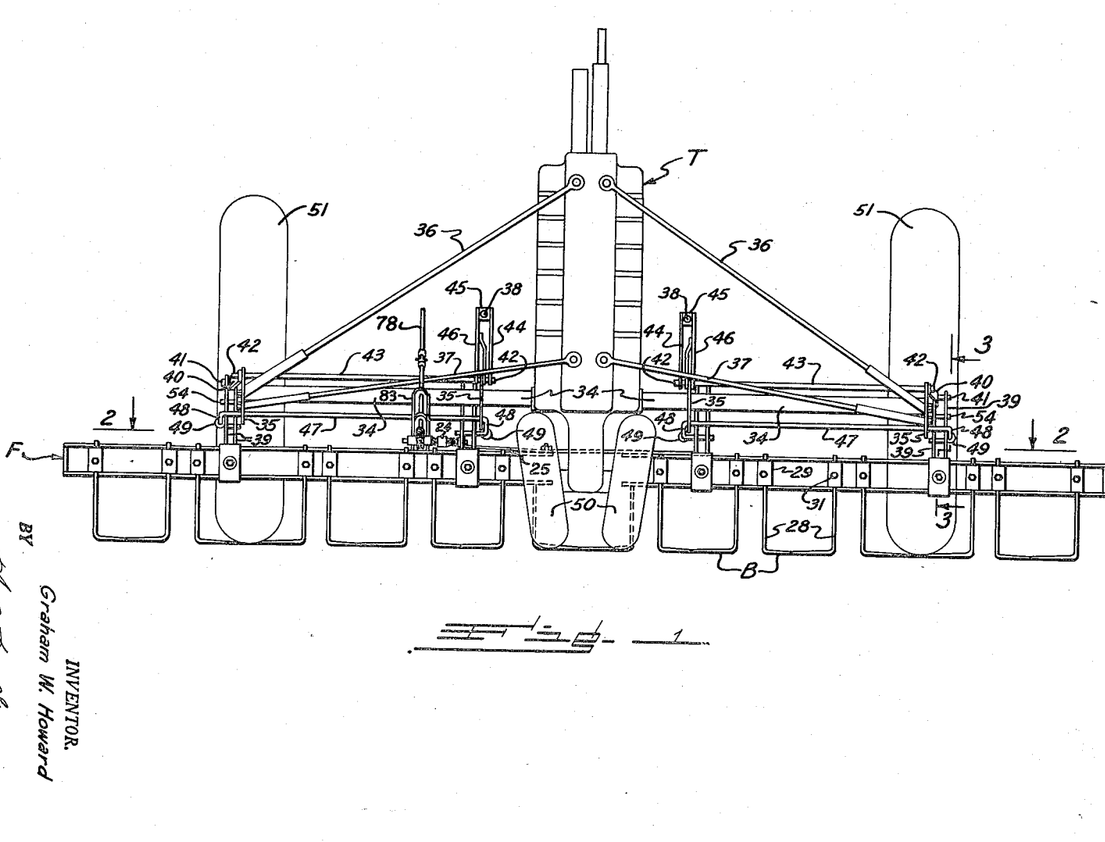
Fig. 1 is a front elevation of apparatus constructed in accordance with this invention and forming a first embodiment thereof, such apparatus being mounted forwardly and beneath a tractor.
Figure 2:
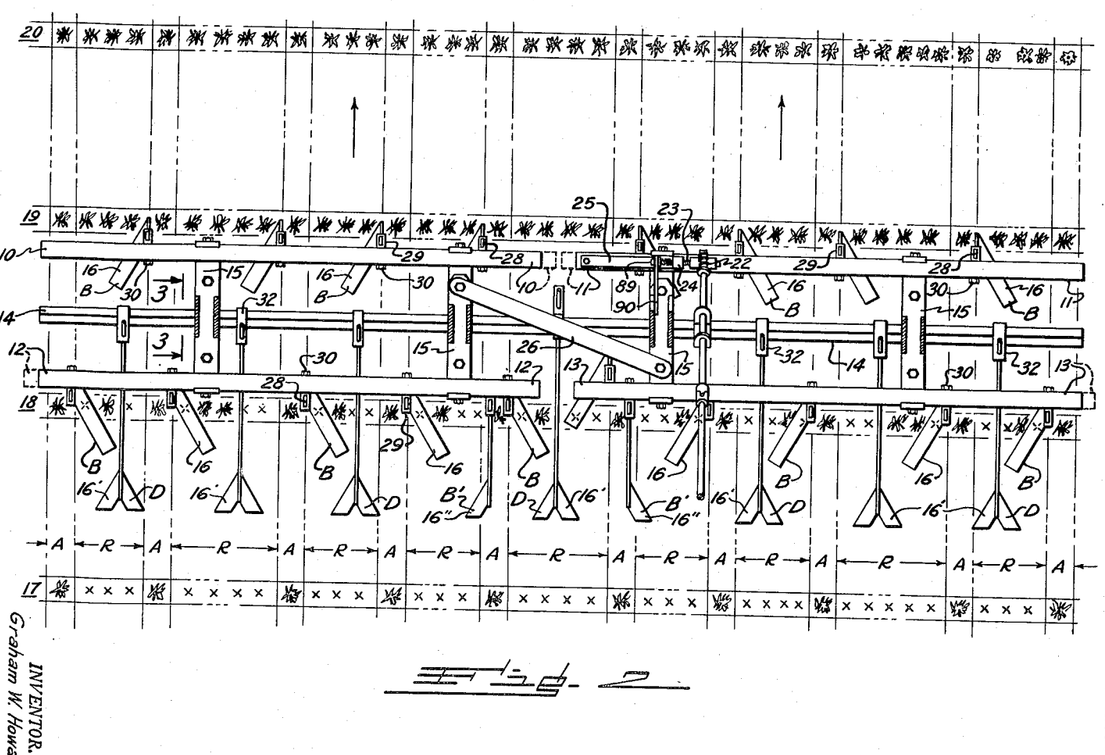
Fig. 2 is a combined top plan view, taken along line 2—2 of Fig. 1, and diagram of the operation of the apparatus of Fig. 1.

Referring to Figs. 1 and 2, the first embodiment of this invention comprises a framework F mounted on a tractor T, the framework F supporting a plurality of blades B, which remove spaced sections of plants as the apparatus is moved across the rows by forward movement of the tractor, in the direction of the arrow of Fig. 2. The blades B are divided into four groups, mounted on front left bars 10, front right bars 11, rear left bars 12, and rear right bars 13, respectively. As is evident from Fig. 2, the front left blades B, mounted on bars 10, are inclined rearwardly to the left; the front right blades B, mounted on bars 11, are inclined rearwardly to the right; the rear left blades B, mounted on bars 12, are inclined rearwardly to the right; and the rear right blades B, mounted on bars 13, are inclined rearwardly to the left. Bars 10, 11, 12, and 13 are each mounted for lateral movement with respect to a central, fixed bar 14, being connected by a suitable number of links 15, such as four, mounted for horizontal pivotal movement with respect to bar 14. Bars 10, 11, 12 and 13 are adjusted laterally in order to vary the blocks or areas A over which the plants are left standing, as in Fig. 2, and in reverse proportion to variation in the removal spaces R.

The blades B are preferably set with their cutting edges 16 extending at an angle to the direction of movement, and also so that a front blade and a rear blade tend to overlap. A duckfoot D is mounted on fixed bar 14 in a central position with respect to each corresponding front and rear blade, each duckfoot D having two oppositely disposed cutting edges 16', while a blade B', having one duckfoot cutting edge 16'', may be mounted adjacent the inner ends of rear bars 12 and 13, for an area not otherwise definitely covered. As will be evident, a front blade and a rear blade, together with a duckfoot D, account for a space R over which the plants are removed. By moving the front blade laterally in one direction, or the rear blade laterally in the opposite direction, or by a simultaneous combination of these two movements, the width of each block A and removal space R may be varied. The duckfeet D may be dispensed with, in certain cases, by placing blades B closer together, or inclined at a greater angle to the direction of movement, but use of duckfeet D, particularly as the last operation in cross blocking or cultivating, is advantageous in that a more uniform mulch tends to be left, weed control is assisted, and mulch is left in the tractor wheel tracks, such mulch normally tending to better follow accepted agronomic practices.

As will be evident from Fig. 2, as the apparatus passes across crop rows 17, 18, 19 and 20 in succession, the plants indicated are standing, with the previous position of removed plants indicated by "x." Thus, row 17 has been blocked, plants from row 18 have been removed by the front rows of blades B, which are just entering row 19, while row 20 is the next to be encountered.

Due to the angle at which the blades B are set, there is a tendency for the blades to cause "side draft," that is, as the blades move through the ground, they tend to cause the apparatus to veer off to one side. However, by slanting one set of front blades, such as those mounted on plate 10, in one direction, such as to the left, and slanting the blades mounted on the other front plate 11 in the opposite direction, such as to the right, the two sets of front blades tend to balance each other and equalize side draft at the front. The rear blades are set oppositely to the corresponding front blades to obtain adjustment of the width of block, while the rear blades on plates 12 and 13 are slanted oppositely to the blades on front plates 10 and 11, respectively, to equalize side draft at the rear. It is to be noted, of course, that if the front blades were all slanted in one direction and the rear blades all slanted in an opposite direction, then the apparatus would tend to be twisted as it moved along the ground, due to the side draft at the front being opposite to the side draft at the rear. As will be evident from the blade setting shown in Fig. 2, the tendency toward side draft is substantially eliminated.

The adjustment of each blade with respect to its corresponding blade, to increase or decrease the width of block, is conveniently done during operation, as a heavier or thinner stand of plants is encountered. Thus, suitable adjusting means is preferably provided which is operable from the tractor seat. One such means includes a crank 21 of Fig. 5, accessible from the tractor seat, and adapted to turn a worm 22 of Figs. 1, 2 and 5, and thereby rotate a threaded spindle 23, to cause an interiorly threaded block 24 of Figs. 1 and 2, to move along spindle 23 to the left or right. A link 25 is pivotally connected to the underside of block 24 and also pivotally connected to the inner end of upper front bar 11, as in Figs. 1, 2 and 6, while worm 22 and spindle 23 are mounted in laterally fixed position, as will be explained in detail later. Movement of block 24 to the left, for instance, will cause bar 11 to move inwardly to the dotted position of Fig. 2. At the same time, right rear bar 13 is moved laterally outwardly by links 15 to the dotted position of Fig. 2 so that the corresponding blades mounted on bars 11 and 13 will move farther apart, to increase the width of removal areas R and simultaneously decrease the width of block areas A at the right side. So as to simultaneously produce a corresponding increase in removal areas and decrease in the blocks at the left side, a bar or link 26 pivotally connects the inner links 15, but on opposite sides of fixed bar 14, so that when right rear bar 13 is moved laterally outwardly to the dotted position of Fig. 2, and simultaneously, due to the pivoting of links 15, the left rear bar 12 will be moved laterally outwardly to the dotted position of Fig. 2. As will be evident, this causes the block areas A to decrease in width and the removal areas R to increase in width, so that the blocks to the left and the right will correspond in width.

Bars 10, 11, 12 and 13 are provided in pairs, and a reinforcing plate 27, as in Fig. 1, may be welded between the upper and lower bars at spaced intervals, for reinforcement purposes. Each blade B may be mounted on or formed integrally with a shank 28, which is clamped against the edge of bars 10, 11, 12 or 13, by a U-clamp 29, as in Figs. 1 and 2. Each U-clamp 29 is provided with toes 30, adapted to engage the opposite edge of the bars, and a set screw 31 is tightened against each shank 28 to maintain the blade B in clamped position. This manner of attachment is similar to that disclosed in copending application Serial No. 728,918, now Patent No. 2,627,216, and it will be understood that other means of attaching the blades B may be utilized, such as also disclosed in said copending application. Duckfeet D may be somewhat similarly mounted on fixed bar 14, which may be square but disposed in diagonal position, the clamps 32 therefor being modified to accommodate such shape.

The framework F, as in Fig. 1, may be mounted upon a support S, which is conventional with the type of tractor T shown. The support S may comprise a pair of tubes 34, attached at their inner ends to the front of the tractor T and provided with fixed supporting plates 35, mounted in vertical position on tubes 34. The outermost plates 35 may also be supported by upper tie rods 36 and lower tie rods 37, adapted to be tightened in a conventional manner. By means of lever rods 38, movable forwardly and backwardly by levers mounted adjacent the tractor seat, four sets of vertical supporting plates 39, of framework F, may be moved upwardly or downwardly, not only to vary the depth of cut of blades B, but also to move the framework F to a position above the ground for movement of the apparatus from one field to the next. The upper end of each framework supporting plate 39 is moved upwardly and downwardly by a lever 40, pivotally attached at its outer end to framework plates 39 by a pin 41. Lever 40 is mounted on the outer end of a lever rod 42, which extends through a reinforcing tube 43, the latter mounted between plates 35. The inner end of lever rod 42 is affixed to the lower end of a link 44, the upper end of which is pivotally attached to the front end of rod 38. Rod 38 is guided in a horizontal bracket 45 at a point rearwardly of link 44, bracket 45 being mounted upon the upper end of a vertical bracket assembly 46, in turn attached to reinforcing tube 43 and one of supporting plates 35.

As will be evident, forward movement of lever rods 38 will raise the framework F, and rearward movement of rods 38 will lower the framework F. To insure that the framework F will remain in a position parallel to the ground, a pivot rod 47 extends laterally between plates 35 of support S, and each rod 47 is provided at its outer end with a rearwardly extending arm 48 attached to an eyebolt 49, in turn attached to framework plates 39.

As will be evident from Fig. 1, the front wheels 50 of tractor T, as well as each rear wheel 51 thereof, is adapted to move along a removal area R of Fig. 2.

Figure 3:
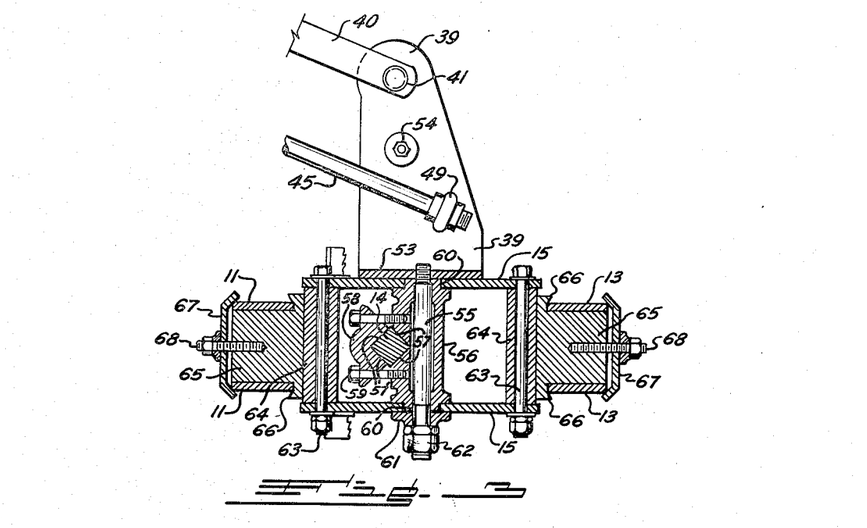
Fig. 3 is a vertical section of a portion of the apparatus of Figs. 1 and 2, taken along line 3—3 of Fig. 2.

Referring now to Fig. 3, each pair of vertical plates 39 of framework F is connected together at the bottom by a base 53, preferably welded thereto, and reinforced by a stud 54 extending therebetween and located centrally between the holes adapted to receive pin 41 adjacent the upper end and eyebolt 49 adjacent the lower end. A shaft 55 depends from and is attached to base 53 in a suitable manner, as by welding, shaft 55 being surrounded by a journal 56 having on the front side machined, V-surfaces 57 adapted to receive two sides of fixed bar 14, which may be a square bar mounted in diamond position as shown. A cap 58 having V-surfaces 57' disposed oppositely the V-surfaces 57, is adapted to clamp the fixed bar 14 to the journal 56, as by means of cap screws 59. Journal 56 is also provided at its upper and lower ends with bosses 60, extending into aligned circular apertures in upper and lower links 15, to permit rotation of the links about the journal. A cap 61, mounted on the lower end of shaft 55, as by nuts 62, reinforces the construction and receives a portion of the weight of the framework F from each lower link 15. The outer ends of links 15 are also provided with suitable holes, disposed in alignment and through which bolts 63 extend, bolts 63 forming pins for pivotal movement of tubes 64, to which mounting blocks 65 are attached in a suitable manner, as by welding. Each mounting block 65, which may be machined from flat plate or the like, is provided with upper and lower flanges 66, against which plates 10, 11, 12 or 13 are clamped, as by a clamp 67 pressed inwardly against the bars in a suitable manner, as by a clamping stud 68 which extends centrally from block 65. As will be evident, shaft 55, journal 56, and fixed bar 14 remain fixed in position during pivotal movement of bars 10, 11, 12 and 13.

Figure 4:
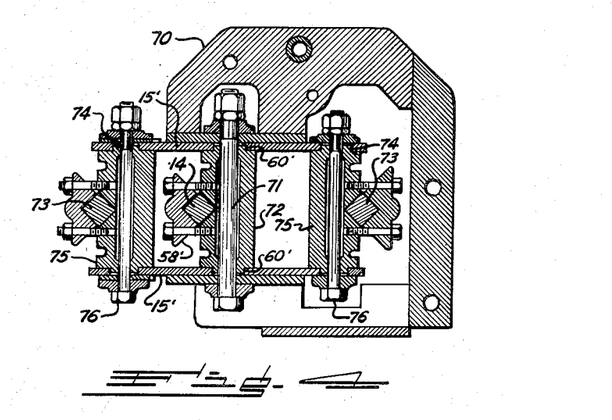
Fig. 4 is a similar vertical section, of a modified construction adapted to be mounted on a different make of tractor.

An alternative construction, for a different type of tractor, normally provided with C-shaped supporting plates, such as plate 70, is shown in Fig. 4. Plate 70 is provided with suitable holes, such as shown, for various tie rods and lifting rods operating in a conventional manner, the plates 70 being adapted to be counted in pairs, similarly to the framework plates 39 of Figs. 1 and 3. A shaft 71 extends between the arms of the C, and a journal 72 having upper and lower bosses 60' is mounted on shaft 71. Also, a central fixed bar 14 is clamped to journal 72 by a cap 58', the cap and journal having machined V-surfaces, to receive bar 14 in diamond position, while links 15' are provided with central apertures through which bosses 60' extend, so that links 15' may pivot about journal 72. In lieu of the flat, parallel bars of the previous construction, the blades B may be mounted on square bars 73, disposed in diamond position, as in Fig. 4, and similar to central bar 14, except that, of course, four bars 73 are provided—two at each side of the apparatus and corresponding to the bars 10, 11, 12 and 13, respectively, of the apparatus of Figs. 1 and 3. The links 15' are further provided with aligned holes at their outer ends, to receive bosses 74 of journals 75, which surround clamping bolts 76. Journals 75 and caps 58' are provided with machined V-surfaces, for clamping bars 73 thereto. As will be evident, pivotal movement of links 15' will produce lateral movement of bars 73, and vice versa, so that the blades mounted on bars 73 may be adjusted in a manner similar to that previously described.

Figure 5:
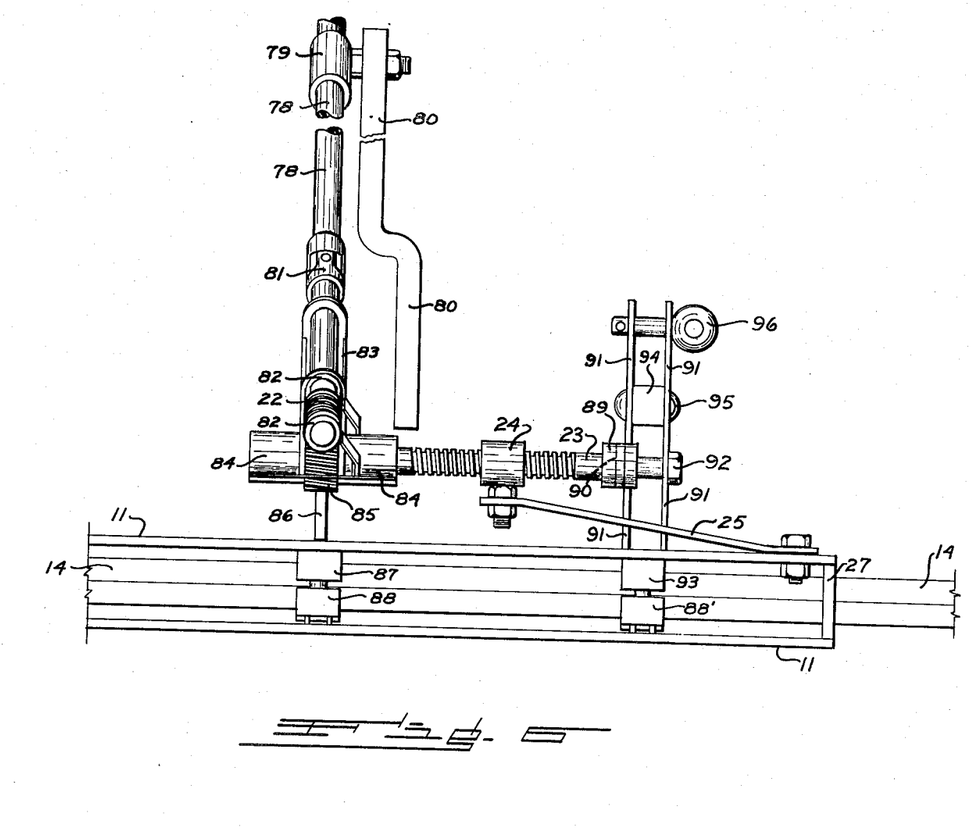
Fig. 5 is a side view of adjusting means forming a portion of the apparatus of Figs. 1 and 2.
Figures 6, 7:
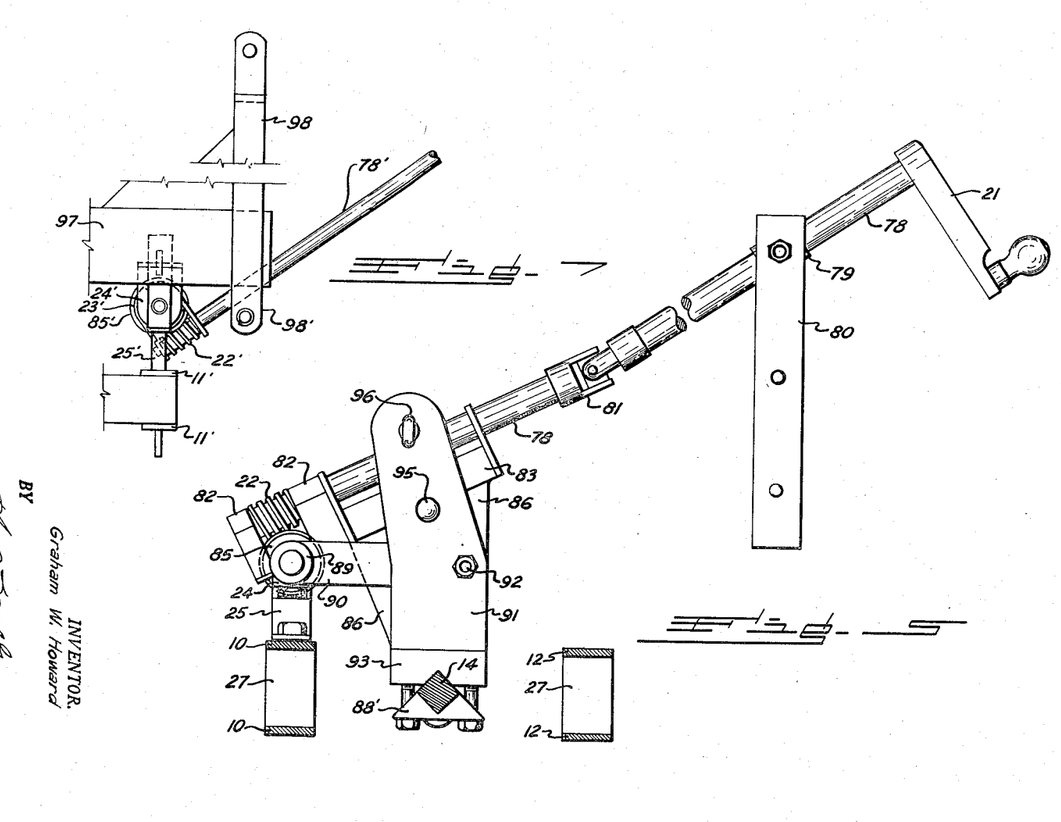
Fig. 6 is a front elevation of the adjusting means of Fig. 5.
Fig. 7 is a partial side view of alternative adjusting means.

Referring now to Figs. 5 and 6, the worm 22 may be turned by crank 21 through a shaft 78, on which crank 21 is mounted in position for easy access by the operator of the tractor. Shaft 78 may be journalled adjacent crank 21 in a bearing 79 supported by a bracket 80, mounted on the tractor adjacent the position of the operator. Worm 22 is keyed or otherwise secured to the forward end of shaft 78, and the shaft 78 is provided with a universal joint 81 to permit the rear end of the shaft to be mounted in any desired position with respect to the front end thereof, and also to accommodate raising and lowering of the framework F. Bearings 82 are provided for shaft 78 on either side of worm 22, and are supported by a strip and plate framework 83, on which are also mounted bearings 84 for spindle 23. Bearings 84 are disposed on opposite sides of a worm gear 85 mounted on the spindle and engaged by worm 22. Framework 83 is mounted on the upper end of a vertical plate 86, which in turn is welded or otherwise secured to a block 87, provided with machined V-surfaces adapted to engage the upper sides of bar 14, and attached to the latter by a cap 88, also provided with machined V-surfaces. The bearings 84, for worm gear 85 are, of course, disposed at or adjacent a point above the front right bars 11, but remain in fixed position due to their being supported from the central fixed bar 14.

The opposite end of spindle 23 is journalled in a bearing 89 mounted on the outer end of a bar 90, which extends forwardly from a pair of vertical supporting plates 91 and attached thereto by a bolt 92. Plates 91 are attached, as by welding, to a base 93, provided with machined V-surfaces adapted to engage the upper sides of bar 14 and clamped thereto by a cap 88'. Plates 91 may be maintained rigidly in spaced position by a cylindrical spacing block 94 disposed between the plates and a rivet 95 extending therethrough. Also, an eyebolt 96 may be provided at the upper end of plates 91, for attachment of a tie rod or the like, if desired.

Alternatively, as shown in Fig. 2, bar 90, which supports bearing 89 for the inner end of spindle 23, may be attached, as by welding, to one of the vertical plates 39 of framework F.

While the worm 22 is overshot, i. e., is disposed above worm gear 85, it may be undershot, i. e., disposed below the worm gear. Such is the case in the construction shown in Fig. 7, which indicates the manner in which an undershot worm may be utilized in the construction illustrated in Figs. 8 to 12, inclusive, which is adapted to be mounted at the rear of the tractor. In Fig. 7, a worm 22' is disposed beneath the worm gear 85', while block 24' is connected, as by a link 25', to a blade mounting bar 11', link 25' being pivotally attached to the block 24' and to the bar 11' in substantially the same manner as link 25 of Figs. 1, 2 and 6. The lower bar 11'' may be a T-shape, as shown, for greater rigidity. Worm 22' is mounted on the lower end of a shaft 78', which extends to a position accessible to the operator. Also, both the bearings for spindle 23', on each side of worm gear 85', and bearing 89' at the inner end of spindle 23', may be mounted in depending position on brackets 97, which in turn are mounted on supporting bars 98, by which the apparatus is mounted on a tractor, as in the manner explained in connection with the construction of Figs. 8 to 12, inclusive.

The apparatus illustrated in Figs. 8 to 12, inclusive, is hydraulically controlled, although it will be understood that a worm and gear control, such as just described and shown in Fig. 7, may be utilized. The apparatus of Figs. 8 to 12 is adapted to be mounted on the rear of a tractor T', to the rear of rear wheels 100. The framework F' thereof includes four sets of blade mounting bars 10', 11', 12' and 13', respectively, corresponding to the mounting bars 10, 11, 12 and 13 of Figs. 1 and 2. The lower mounting bars, such as bars 10'' and 12'', may be T-shaped, as explained previously. The blades B are similar in construction to the blades described previously, being mounted or formed integrally with a post 28, clamped against one edge of plates 10', 11', 12' and 13' by a slotted U-clamp 29, as in Fig. 10, the blades being omitted from Fig. 8 for the sake of clarity, but their position being as shown in Fig. 2. As before, each U-clamp 29 has outwardly projecting toes 30 adapted to bear against the opposite edges of the upper and lower blade mounting bars, pressure against post 28 being obtained by set screws 31.

The tractor T' includes conventional power operated lifting arms 101, which extend from beneath the rear axle housing 102 of the tractor and are maintained in alignment by guide arms 103, pivotally attached at their forward ends to the tractor and at their rear ends to a bar 104, extending between lifting arms 101. The tractor T' is also provided with a conventional guide link 105, to insure that the framework F' will maintain parallel positions during up and down movement.

The apparatus of Figs. 8 to 12 is supported from the tractor by pivotal connections on a pair of bars 98, shown also in Fig. 7 and which are inclined outwardly and downwardly from a short connecting plate 106, to which the bars 98 are welded adjacent the upper ends thereof. Also, each bar 98 is formed with a vertical section 107 at the lower end, and at the upper end with a relatively short, vertical section 108 which extends above plate 106. A rod 109 extends through the lower end of the lower vertical sections, and provides at each side a pin to form a pivotal connection for power lifting arms 101. The upper vertical sections 108 of bars 98 may be drilled to receive a pin 110, for pivotal connection to guide link 105. The central fixed bar 14' of the framework F' may be box-shaped, as shown, and mounting plates 111, suitably having an inverted L-shape, are slotted at the lower ends, for welding to box 14'. The plates 111 preferably extend outwardly at an angle, as in Fig. 8, and the upper arm of each L plate 111 is attached in a suitable manner, as by welding, to the lower vertical section 107 of a bar 98. For additional reinforcement, a pair of tubes 112 may extend from plate 106 downwardly and outwardly to juncture with box 14' and the respective mounting plate 111, the tubes 112 being cut at their ends to provide for their being welded together and to plate 106 at their upper ends, and also being welded to mounting plates 111 and box 14' at their lower ends. Additional reinforcement for plates 111 may be obtained by rods 113, each of which is welded at its upper end to the forward edge of a bar 98 and at its lower end to the upper edge of a plate 111. As will be evident, any suitable supporting framework construction may be utilized, differing perhaps radically in detail from the specific construction just described.

The blade mounting bars 10', 11', 12' and 13' are mounted for lateral movement on links 15', in turn pivotally mounted on the central fixed longitudinal member 14', which may be a box, as shown, although other structural shapes, such as an I-beam, channel, tube, or other shape, may be utilized. A link 25' is connected across the opposite ends of the inner links 15', so that when bar 11', for instance, is moved outwardly to the dotted position of Fig. 8, the bar 10' will also be moved outwardly to the dotted position, and the rear bars 12' and 13' will be moved inwardly, in substantially the same manner as that described previously in connection with the apparatus of Figs. 1 and 2.

Movement of the bars 10', etc. may be produced by a power cylinder 115, described in detail later, but in general pivotally mounted at its rear end on a pin 116 (shown also in Fig. 12) mounted on box 14', and having a piston rod 117 pivotally attached at its outer end to a bracket 118 mounted on a link 15', as in Fig. 8. Movement of piston rod 117 is controlled by the pressure of fluid supplied to power cylinder 115 from a pressure cylinder 119 through flexible tubes 120 and 121, connecting the respective ends of cylinders 115 and 119. Preferably, the piston rod end of the pressure cylinder is connected to the piston rod end of the power cylinder, and the opposite ends of the cylinders also connected, as shown. Such fluid pressure is adjusted by movement of a piston rod 122 of pressure cylinder 119, as by turning a hand wheel 123 disposed in a convenient position for access by the operator, such as near seat 124 of tractor T'. As will be evident from a more detailed description of the power and pressure cylinders to be given later, when the hand wheel 120 is turned in one direction, fluid under pressure is forced through flexible tube 120 from one end of pressure cylinder 119 to the corresponding end of power cylinder 115, thereby causing piston rod 117 thereof to move inwardly into cylinder 115. This will cause the adjacent link 15" to pivot, and the bars 11" to move inwardly, with a corresponding inward movement of bar 10' and an outward movement of bars 12' and 13'. Similarly, when hand wheel 123 is rotated in the opposite direction, fluid is forced under pressure through tube 121, which causes piston rod 117 to move outwardly, thereby moving bar 11' outwardly, as to the dotted position of Fig. 8, together with an outward movement of bar 10' and an inward movement of bars 12' and 13'. Since tubes 120 and 121 connect the opposite ends of pressure cylinder 119 and power cylinder 115, during such adjustment the fluid displaced from power cylinder 115 is returned to pressure cylinder 119 through the opposite tube 120 or 121, as the case may be.

In the event that in a specific field or portion thereof, the plant growth is relatively uniform and little or no adjustment is required, it may be desired to lock the blades B in a specific position. For this purpose, the rear bars 12' and 13' may be locked together by a stud 126, provided with a central wrench engaging hex 127 and opposite threads on the opposite ends adapted to extend through suitable fixed nuts 128 mounted on brackets 129. Nuts 128 are right and left handed in accordance with the end of stud 126 to be engaged, while brackets 129 are welded or otherwise suitably attached to rear bars 12' and 13' adjacent the inner ends thereof. Stud 126 and fixed nuts 128 may be removable as a unit from brackets 129, as by providing cooperating slots in nuts 128 and brackets 129, to prevent rotation of nuts 128 but still provide easy removability. In setting the bars to fixed position, the adjustment may be made by turning stud 126, or the position of the bars may be adjusted by rotating hand wheel 123 in the proper direction until the desired position is secured, after which nuts 128 may be adjusted on stud 126, and the nuts then inserted in the slots in brackets 129. It will be understood, of course, that adjustment by hand wheel 123 is not possible during use, when stud 126 is in locking position.

The bars 10', 11', 12' and 13' may be mounted on links 15' and box 14' in any suitable manner, such as that shown in Figs. 9 and 10, wherein a link 15' is disposed both above and below box 14', and links 15' are provided with aligned central holes or apertures through which a central bolt 131 extends, each bolt 131 acting as a pivot for links 15'. The ends of links 15' are also provided with suitable aligned holes through which outer bolts 132 extend, to provide a pivot for a journal 133 surrounding each bolt 132 between the links 15'. A web 134 formed integrally with or preferably welded to each journal 133, extends to the front and rear, respectively, of each journal 133, and the bars 10' etc. are attached, preferably in a fixed manner, as by welding, to the webs 134. As will be evident, the bars 10' etc. will remain in parallel positions as the links 15' pivot.

Figures 10, 11, 12:
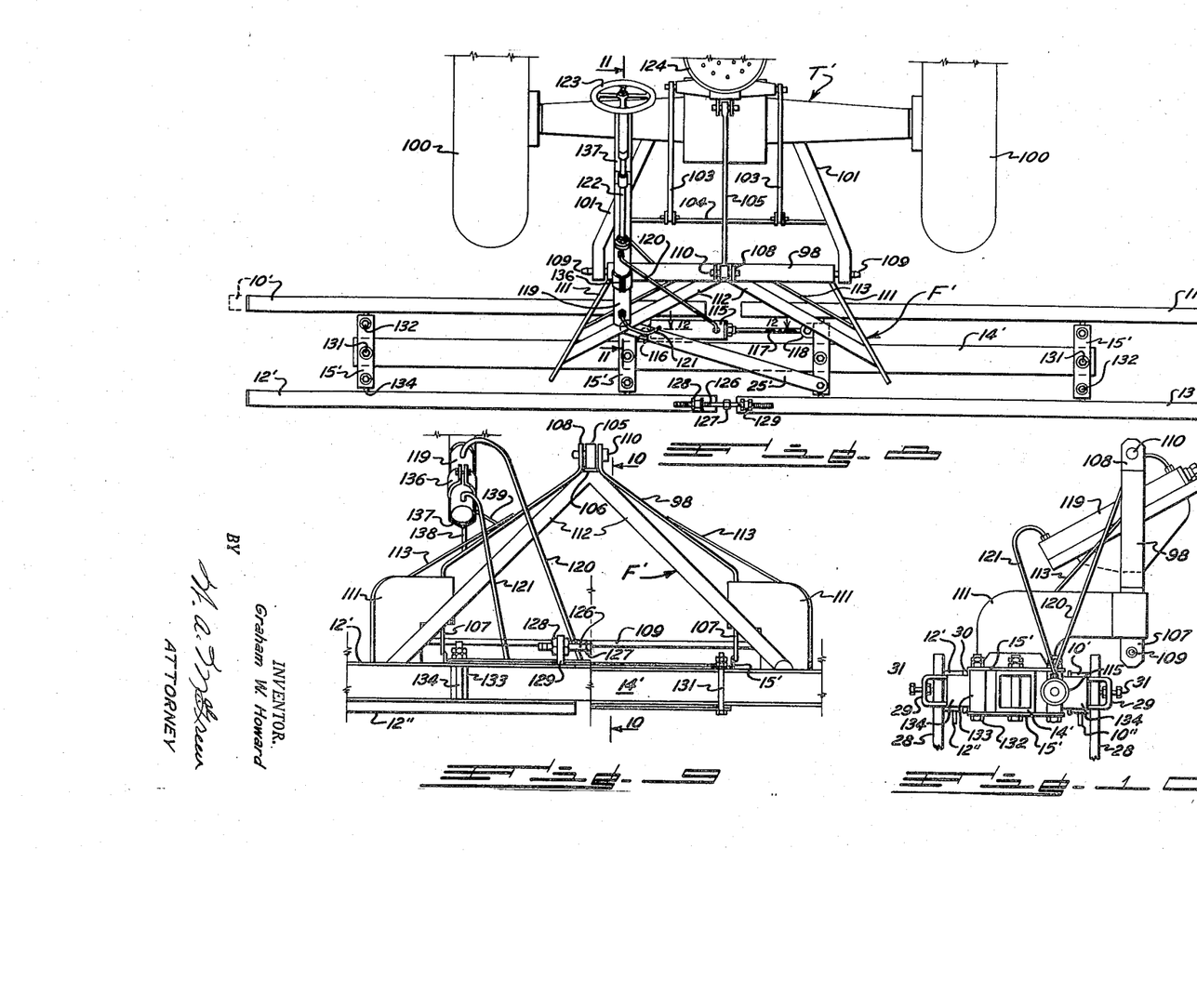
Fig. 10 is a vertical section taken along line 10—10 of Fig. 9.
Fig. 11 is a longitudinal section taken along line 11—11 of Fig. 8, through a control cylinder of the apparatus of Fig. 8.
Fig. 12 is a similar section taken along line 12—12 of Fig. 8, through a power cylinder.
Figures 11, 12:
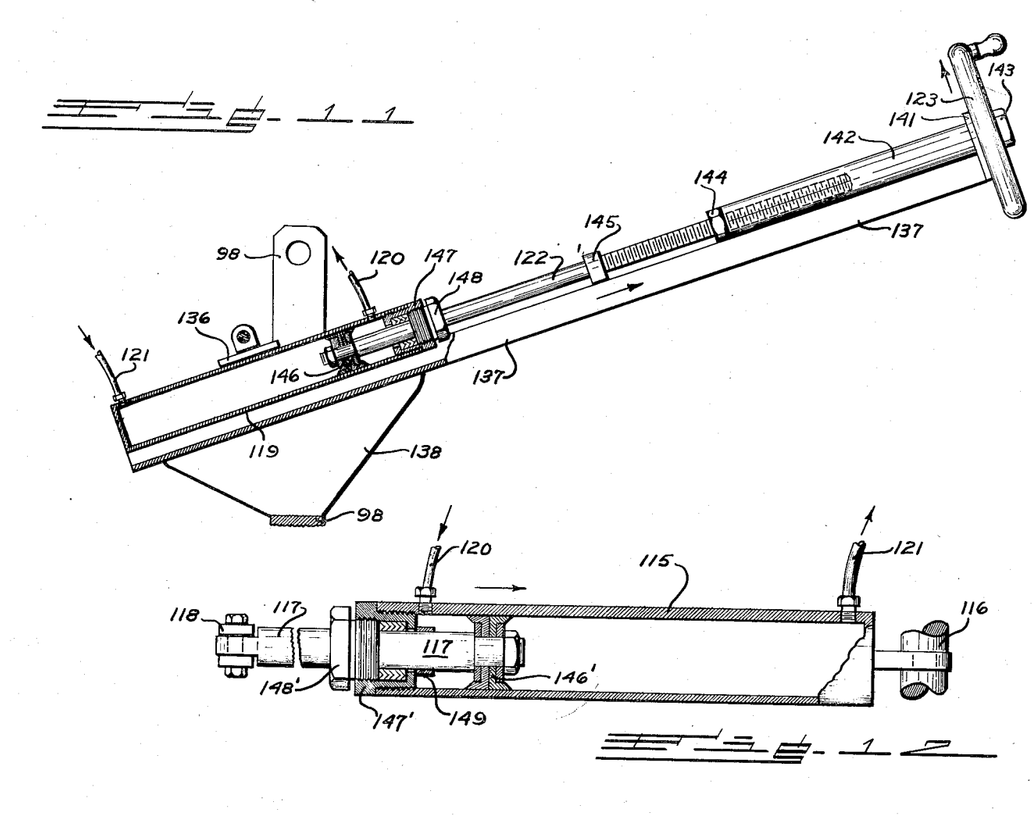

Pressure cylinder 119, as in Figs. 8, 9 and 11, may be attached by a clamp 136 to a V or trough-shaped bracket 137, which extends upwardly in an inclined position to a point adjacent seat 124 of tractor T'. Bracket 137 may be supported by a web 138, welded or otherwise suitably attached to one of bars 98, while an additional reinforcing rod 139 may also be provided, as in Fig. 9. As shown more clearly in Fig. 11, bracket 137 is provided at its upper end with a bearing 141 for a hollow tube 142, to the upper end of which hand wheel 123 is attached, as by a bolt 143, the upper end of tube 142 being threaded interiorly to receive bolt 143. In addition, a nut 144 is welded or otherwise suitably secured to the lower end of tube 142, so that as hand wheel 123 is turned, the piston rod 122, which is threaded for a suitable distance along its upper end, will be moved upwardly or downwardly in nut 144, being received in tube 142. Bracket 137 also forms a guideway for a slide 145, which is mounted on piston rod 122 at the lower end of the upper threaded portion, and which acts as a gage, to indicate to the operator the amount or width of cut or block.

Pressure cylinder 119 is closed at its lower end, as shown, and receives a piston 146, provided with suitable packing and secured to the lower end of piston rod 122. Cylinder 119 is also provided at its upper end with a suitable cap 147 and packing gland 148 or the like, adapted to seal the upper end of the cylinder and permit movement of piston rod 122 therethrough, the piston rod, piston and packing being prevented from turning by slide 145. As will be evident from Fig. 11, when hand wheel 123 is rotated in the direction of the arrow, nut 144 will be threaded onto rod 122, thereby moving piston 146 upwardly in the direction of the arrow adjacent slide 145, and forcing fluid within cylinder 119 out through flexible tube 120, as indicated by the arrow, and into pressure cylinder 115, as also indicated by the arrow. This forces piston 146' of power cylinder 115 in the direction of the arrow adjacent thereto, and, at the same time, fluid displaced in the power cylinder is returned to pressure cylinder 119 through tube 121, as indicated by the arrows. Conversely, when the hand wheel 123 is rotated in a direction opposite to the arrow, the nut 144 will tend to be threaded off the piston rod 122, so that piston 146 will be moved downwardly in cylinder 119, thereby forcing fluid out through tube 121. Also, fluid displaced in the power cylinder will be returned to the pressure cylinder 119, this time through tube 120, the movement of the fluid and the pistons being opposite to the direction of the arrows.

Power cylinder 115, as in Fig. 12, may be constructed similarly to pressure cylinder 119, being closed at one end and provided at the opposite end with a cap 147' and gland 148', or equivalent construction, to seal the end of the cylinder and, at the same time, permit movement of piston rod 117 therethrough. Piston 146' in power cylinder 115 may be similar in construction to the piston in pressure cylinder 119. Piston rod 117 of the power cylinder may be provided with a stop 149, adapted to abut against cap 147', as in the position shown, to limit the movement of rod 117.

As will be evident, the combination of pressure cylinder 119 and power cylinder 115 is a closed system, since when fluid is forced into one side of power cylinder 115, through tube 120, due to upward movement of piston 146 of the pressure cylinder, the piston 146' of the power cylinder 115 will be displaced, in the direction of the arrow of Fig. 12, but fluid in the opposite side of cylinder 115 will be forced out through tube 121, to return to pressure cylinder 119. By appropriate rotation of hand wheel 123, a substantially immediate response in the position of the bars 10' etc., and the spacing of the blades B will be obtained.

From the foregoing, it will be apparent that the apparatus of this invention fulfills to a marked degree the objects and requirements hereinbefore set forth. By mounting the blades in separate sets, with the blades in the two front sets inclined in opposite directions, and the same for the blades of the rear sets, the tendency toward side draft or twisting of the machine during use is obviated. Also, by providing means for moving the rear sets outwardly when the forward sets are moved inwardly, and vice versa, as by the connecting link 15 or 15', adequate and accurate adjustment of the blades may be secured. The adjustment of the blades is preferably from the seat of the tractor, and numerous constructions are adequate to fulfill this requirement. Thus, a mechanical adjustment, such as involving a worm and spindle, and a block moved by the spindle, the worm being either overshot or undershot, or other mechanical means, may be utilized. Also, a hydraulic system may be used, a suitable one being that described herein. A particular advantage of the blade adjustment in opposite sets lies in the fact that the blocks, when adjustment is made, decrease or increase in width equally from both sides of the row, so that the blocks remain in the same position relative to the lateral moveemnt of the tractor across the rows. This permits the tractor to pass along the same path, during subsequent operations, such as cultivating, and produces straight, aligned blocks across the rows.

The lateral adjustment of the blades may be secured by mounting the bars 10 etc. or 10' etc. in the manner shown, but other means to provide a desired lateral movement may be utilized. In general, the apparatus of this invention is adapted to be mounted on an existing tractor or the like, and to utilize the means for raising and lowering the apparatus, normally conventional with such tractors. As in Fig. 1, the apparatus may be mounted adjacent the front of the tractor, while, as in Fig. 8, the apparatus may be mounted at the rear of the tractor. It will be understood, of course, that the apparatus may be mounted in other positions, and that other and different mechanism for raising and lowering the apparatus may be employed. While the blades may be mounted on parallel bars, as by U-shaped clamping brackets, it will be understood that the blades may be mounted in a different manner, as on the square bars disposed in diagonal position, shown in Fig. 4. Also, discs, duckfeet and other slicing or cultivating tools may be substituted in whole or in part for the blades B.

Any suitable material may be used. Thus, the bars 10, 11, 12 and 13, etc., may be made of high carbon steel, similar to rail steel, but other material may be utilized. Also, it will be understood that the apparatus may be utilized as a down-the-row cultivator, or for other purposes. It will also be understood that the apparatus may be provided with discs or other cultivator tools, instead of the blades B, as shown, and that, where appropriate, the term "blades" is intended to refer also to discs and other cultivator tools.

Although several embodiments of this invention have been illustrated and described, it will further be understood that other embodiments may exist and that changes in addition to those enumerated may be made, all without departing from the spirit and scope of this invention.

What is claimed is:

1. In apparatus for blocking row crops and the like, and adapted to be mounted on the rear of a tractor provided with arms movable upwardly and downwardly, the improvement which comprises a framework pivotally connected to said arms and having downwardly and outwardly extending members providing spaced supporting points; a central box mounted on the lower end of said framework at said supporting points; links pivotally mounted on said box and extending generally horizontally both to the front and rear of said box; four sets of blade supporting bars pivotally attached to said links adjacent the ends thereof, said blade supporting bars comprising left and right front bars, and left and right rear bars; a plurality of blades mounted on said bars, said blades having generally horizontal cutting edges angularly disposed, the cutting edges of the front left blades being disposed angularly opposite to the cutting edges of the right front blades, and the cutting edges of the rear blades being disposed angularly opposite to the corresponding front blades; means connected to said box and to one of said links between said supporting points for moving one of said bars laterally; and linkage means connecting a front bar with the opposite rear bar and disposed between said supporting points, whereby the front bars may be moved laterally in opposite directions and the rear bars in opposite directions to the corresponding front bars.

2. Apparatus for blocking row crops and the like, comprising movable supporting means; a plurality of cutting blades mounted in spaced relation on said supporting means and also in position to sever or remove plants from spaced areas over which said supporting means is moved, means including removable clamping devices for so mounting said cutting blades, said blades being disposed in four sets, left and right front sets and left and right rear sets, and the cutting edges of said blades being inclined with respect to the direction of movement, the left and right front sets being inclined in opposite directions and the left and right rear sets also being inclined in opposite directions; and means including a control member and linkage connecting the same in said movable supporting means for moving respective front and rear blades laterally relative to each other to change the spacing of said blades.

3. A cross row blocker comprising a frame having means for its attachment to a vehicle; four supports including left and right front and left and right rear supports for mounting corresponding series of blocking knives in laterally spaced positions and having cutting surfaces arranged at a suitable cutting angle, clamping devices engaging portions of the knives and said supports for maintaining the knives in said spaced positions, said supports being mounted on said frame for lateral movement relative to each other to vary the spacing of the cutting surfaces of said knives; and means interconnecting the left front and rear supports and the right front and rear supports for moving said left and right front supports in opposite lateral directions to each other and in opposite directions to the respective left and right rear supports, said last-named means including a control member disposed adjacent the operator of the blocker and a linkage connection between said member and the supports.

4. In a cross row blocker, a central beam adapted to be transversely supported from a vehicle; a series of supports mounted in tandem pairs parallel to said beam for opposite longitudinal movement with respect to each other; a series of blocking knives mounted in laterally spaced positions on said supports and having cutting surfaces arranged at a suitable cutting angle; clamps engaging said knives and said supports to hold the former to the latter; means associated with the central beam and interconnecting the series of supports for adjusting the position of at least one of said supports; and linkage means for transmitting the adjusting movement to the other said supports.

5. Apparatus for blocking row crops and the like comprising movable elongated supporting means; a plurality of cutting blades adapted to be mounted in longitudinally spaced relation on said supporting means and also in position to sever or remove plants from spaced areas over which said supporting means is moved; means including releasable clamping devices engaging portions of the blades and the supporting means for mounting said blades in such position and in four sets, left and right front sets and parallel left and right rear sets; and means for bodily moving said front and rear sets longitudinally relative to each other and said left and right sets in opposite directions longitudinally to change the spacing of said blades.

6. Apparatus for blocking row crops and the like, as defined in claim 5, including means for mounting said supporting means on a tractor or the like, and mechanical means operable by the operator of said tractor and operably connected to said means for bodily moving said front and rear sets for adjusting the position of said blades during movement.

7. In apparatus for blocking row crops and the like, a main support, a set of four laterally extending supports mounted in substantially parallel relation in a front set of two supports and a rear set of two supports; links pivoted on said main support and pivotally connecting the corresponding front and rear supports; a plurality of cutting blades mounted in spaced relation on said supports in position to sever or remove plants from spaced areas; means for moving one said support laterally; and a bar connecting two of said links adjacent the connections with the oppositely disposed supports.

8. In apparatus for blocking row crops and the like, a set of four laterally extending supports mounted in substantially parallel relation in a front set of two supports and a rear set of two supports; links pivotally connecting the corresponding front and rear supports; a plurality of cutting blades mounted in spaced relation on said supports in position to sever or remove plants from spaced areas; means for moving one said support laterally; a bar connecting two of said links of oppositely disposed supports; a central laterally fixed beam; and said links being pivoted on said central beam.

9. In apparatus for blocking row crops and the like, as defined in claim 8, said moving means being mounted on said beam and including a link pivotally attached to one of said supports.

10. In apparatus for blocking row crops and the like, as defined in claim 7, wherein said means for moving one said support laterally includes a threaded spindle; a worm and gear for turning said spindle; an internally threaded block movable along said spindle; and a link pivotally connecting said block with said one support.

11. In apparatus for blocking row crops and the like, and adapted to be mounted on a tractor provided with a support movable upwardly and downwardly and including depending supporting plates, the improvement which comprises a central bar transversely mounted on the lower end of said supporting plates; links pivotally mounted on said bar and extending generally horizontally both to the front and rear of said bar; four sets of transverse blade supporting bars pivotally attached to said links adjacent the ends thereof, said blade supporting bars comprising left and right front bars, and left and right rear bars; a plurality of blades mounted on said bars, said blades having generally vertical posts attached to said bars and generally horizontal cutting edges angularly disposed, the cutting edges of the front left blades being disposed angularly opposite to the cutting edges of the right front blades, and the cutting edges of the rear blades being disposed angularly opposite to the corresponding front blades; means for moving one of said bars laterally; and linkage means connecting a front bar with the opposite rear bar, whereby the front bars may be moved laterally in opposite directions and the rear bars in opposite directions to the corresponding front bars.

12. In apparatus for blocking row crops and the like, as defined in claim 11, wherein said central bar is clamped on a journal which surrounds a shaft depending from said supporting plates, and also wherein said blade supporting bars comprise upper and lower sets of plates disposed in parallel relation and clamped to the pivotal connection to said links.

13. In apparatus for blocking row crops and the like, and adapted to be mounted on a tractor provided with a support movable upwardly and downwardly; the improvement which comprises spaced depending supporting plates; a central bar mounted on said supporting plates; a shaft mounted on each said supporting plate; a journal surrounding each shaft; links pivotally mounted on said journals and extending generally horizontally both to the front and rear of said central bar; a journal and shaft attached to each end of each link; four sets of blade supporting bars each independently clamped to at least one of said journals, said blade supporting bars comprising left and right front bars, and left and right rear bars; a plurality of cutting blades mounted on said bars and having generally horizontal cutting edges angularly disposed, the cutting edges of the front left blades being disposed angularly opposite to the cutting edges of the right front bars, and the cutting edges of the rear blades being disposed angularly opposite to the corresponding front blades; extensible means for moving one of said bars laterally; and linkage means connecting a front bar with the opposite rear bar, whereby the front bars may be moved laterally in opposite directions and the rear bars in opposite directions to the corresponding front bars.

14. In apparatus for blocking row crops and the like, and adapted to be mounted on a tractor provided with a support movable upwardly and downwardly, the improvement which comprises a central bar mounted on the lower end of said support; links pivotally mounted on said bar and extending generally horizontally both to the front and rear of said bar; a pivotal connection at the ends of said links for four sets of blade supporting plates; said blade supporting plates comprising left and right front plates, and left and right rear plates; a plurality of blades mounted on said plates and having generally horizontal cutting edges angularly disposed, the cutting edges of the front left blades being disposed angularly opposite to the cutting edges of the right front blades, and the cutting edges of the rear blades being disposed angularly opposite to the corresponding front blades; extensible means for moving one of said plates laterally; and linkage means connecting a front plate with the opposite rear plate, whereby the front plates may be moved laterally in opposite directions and the rear plates in opposite directions to the corresponding front plates.

15. In apparatus for blocking row crops and the like, and adapted to be mounted on the rear of a tractor provided with arms movable upwardly and downwardly, the improvement which comprises a framework pivotally connected to said arms and having downwardly and outwardly extending members providing spaced supporting points; a central box mounted on the lower end of said framework at each of said supporting points; links pivotally mounted on each of said boxes and extending generally horizontally both to the front and rear of said box; four sets of blade supporting bars; each of said sets being independently and pivotally attached to some of said links adjacent the ends thereof, said blade supporting bars comprising left and right front bars, and left and right rear bars; a plurality of blades mounted on said bars, said blades having generally horizontal cutting edges angularly disposed, the cutting edges of the front left blades being disposed angularly opposite to the cutting edges of the right front blades, and the cutting edges of the rear blades being disposed angularly opposite to the corresponding front blades; extensible means connected to at least one of said bars for moving said bar laterally; and linkage means connecting a front bar with the opposite rear bar whereby the front bars may be moved laterally in opposite directions and the rear bars in opposite directions to the corresponding front bars.

16. In apparatus for blocking row crops and the like, as defined in claim 15, including mechanical means operable from the seat of said tractor for actuating hydraulic means operably connected to said extensible means.

17. In apparatus for blocking row crops and the like, as defined in claim 15, wherein said extensible means includes a stud having opposite threads at its ends, and means connected to adjacent plates and engaging said threads for moving said plates toward or away from each other laterally, in accordance with the direction in which said stud is turned.

18. In apparatus for blocking row crops and the like having means for its attachment to the draw bar of a tractor, a support frame, two rows of blades adjustably disposed on the support frame in a common horizontal plane including a forward row and a rearward row extending transversely to the direction of movement of the apparatus, the blades in the forward row at one side of center being inclined to the direction of movement of said apparatus, the blades in the forward row at the other side of center being inclined in a direction opposite to the blades at said one side of center, the rearward row of blades at one side of center being inclined oppositely to the forward row of blades at said one side of center and the blades in the rearward row at the opposite side of center being inclined oppositely to the corresponding blades in the forward row, and a common linkage connection carried by the support frame and connected to the forward and rearward rows of blades to cause by a single movement a corresponding lateral adjustment of all of the rows with respect to one another to effect a spacing change in the cut of said blades when they are moved forwardly along a surface to be cultivated.

19. In apparatus for blocking row crops and the like having means for its attachment to the draw bar of a tractor, a support frame, two rows of blades adjustably disposed on the support frame in a common horizontal plane including a forward row and a rearward row extending transversely to the direction of movement of the apparatus, a transverse fixed beam disposed between the two rows, the blades in the forward row at one side of center being inclined to the direction of movement of said apparatus, the blades in the forward row at the other side of center being inclined in a direction opposite to the blades at said one side of center, the rearward row of blades at one side of center being inclined oppositely to the forward row of blades at said one side of center and the blades in the rearward row at the opposite side of center being inclined oppositely to the corresponding blades in the forward row, and common linkage and control means carried by the support frame and connected to said rows of blades and said transverse beam to cause by a single movement thereof a correspondingly lateral precision adjustment of all of the rows with respect to one another and relative to the fixed beam.

20. Apparatus for blocking row crops and the like having means for its attachment to the draw bar of a vehicle, a support frame comprising a set of laterally extending supporting bars mounted in substantially parallel relation and comprising four in number, namely a front pair of supports and a rear pair of supports, a plurality of cutting blades adjustably carried by each of said supporting bars, the blades of the front pair of supporting bars on opposite sides of center being inclined in opposite directions to the direction of movement of the vehicle and the blades of the rear pair of supporting bars being oppositely inclined at opposite sides of center and to the direction of movement of the apparatus, the angle of inclination of the blades of the rear pair of bars being reversed from the angle of inclination of the blades of the corresponding forward pair of bars, and common linkage connecting means carried by the supporting bars and interconnecting the pair of supporting bars to cause by a single movement of said means a corresponding lateral precision adjustment of all of the rows with respect to one another to effect a spacing change in the cut of the blades when they are moved forwardly along a surface to be cultivated.

GRAHAM W. HOWARD.

References Cited in the file of this patent

UNITED STATES PATENTS

| Number | Name | Date |
|---|---|---|
| 486,614 | Lindgren | Nov. 22, 1892 |
| 696,623 | Bender | Apr. 1, 1902 |
| 815,744 | Rice | Mar. 20, 1906 |
| 828,615 | Lindgren | Aug. 14, 1906 |
| 924,288 | Smith | June 8, 1909 |
| 1,601,512 | Silaj | Sept. 28, 1926 |

FOREIGN PATENTS

| Number | Country | Date |
|---|---|---|
| 33,391 | Sweden | Aug. 1, 1911 |

OTHER REFERENCES

"Cross Blocking Sugar Beets," Dept. of Agriculture Leaflet No. 97, issued Aug. 1933.